United States Patent [19]

Hartley et al.

[11] 3,963,448
[45] June 15, 1976

[54] TWO-BED CATALYTIC CONVERTER

[75] Inventors: Frederick J. Hartley, Waterford, Wis.; Michael R. Foster, Columbiaville, Mich.

[73] Assignee: General Motors Corporation, Detroit, Mich.

[22] Filed: Nov. 21, 1974

[21] Appl. No.: 525,772

Related U.S. Application Data

[63] Continuation-in-part of Ser. No. 310,717, Nov. 30, 1972, abandoned.

[52] U.S. Cl. ............................ 23/288 FB; 60/301
[51] Int. Cl.² .......................................... F01N 3/15
[58] Field of Search ...... 23/288 F, 288 FA, 288 FB, 23/288 FC; 60/301; 259/4 R, 18, 36; 137/604

[56] References Cited
UNITED STATES PATENTS

| | | | |
|---|---|---|---|
| 3,591,345 | 7/1971 | Hochman et al. | 23/284 X |
| 3,615,255 | 10/1971 | Patterson et al. | 23/288 F |
| 3,729,936 | 5/1973 | De Palma et al. | 23/288 F X |
| 3,766,536 | 10/1973 | Hile | 23/288 F X |

FOREIGN PATENTS OR APPLICATIONS 960,900   6/1964   United Kingdom ............... 23/288 F Primary Examiner—Morris O. Wolk
Assistant Examiner—Roger F. Phillips
Attorney, Agent, or Firm—K. H. MacLean, Jr.

[57] ABSTRACT

A low profile two-bed catalytic converter including substantially identical top and bottom housing plates and top and bottom catalyst-retaining plates therebetween which define an inclined catalyst-containing space. A plurality of openings in the retaining plates distribute exhaust flow uniformly through the catalyst-containing space. A partition made up of two spaced plates has a plurality of uniformly distributed exhaust flow apertures therein and extends through the catalyst-containing space to divide the space into upper and lower catalyst beds. An air distribution means between the partition plates has outlet nozzles for discharging air laterally into streams of exhaust gas flowing through apertures in the air distribution means as the exhaust gases pass from the upper to the lower catalyst bed.

4 Claims, 4 Drawing Figures

U.S. Patent   June 15, 1976   3,963,448
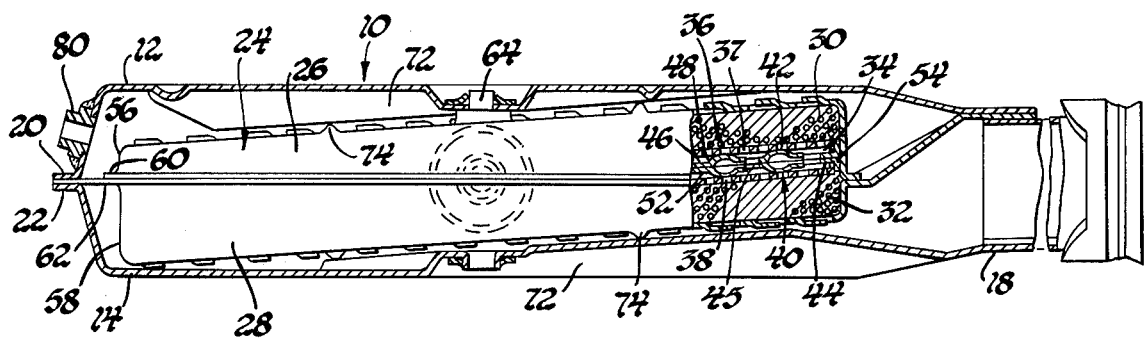
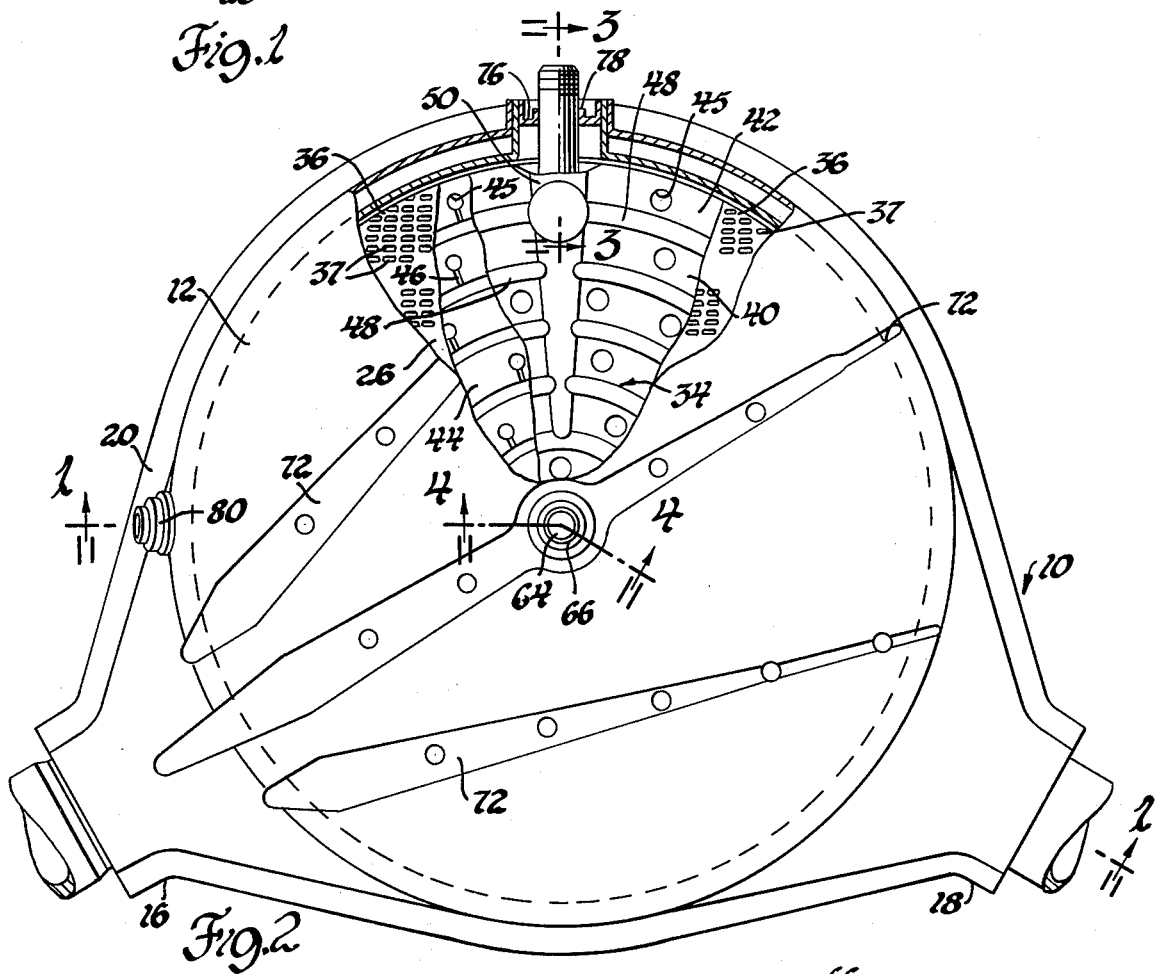
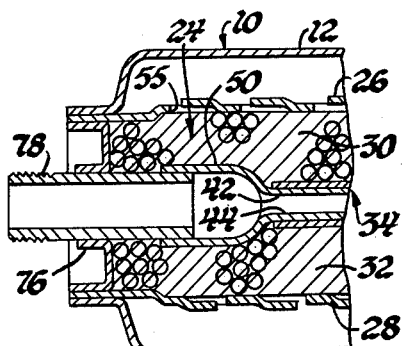
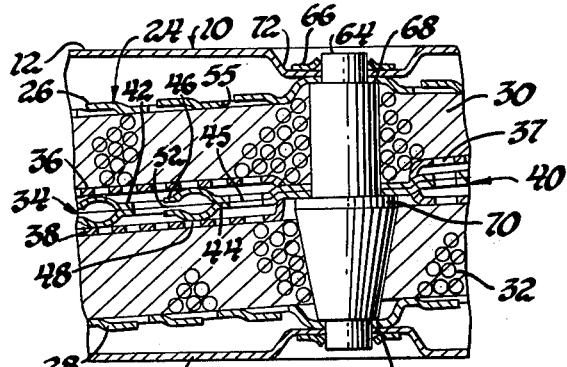

TWO-BED CATALYTIC CONVERTER

This application is a continuation-in-part of Ser. No. 310,717, now abandoned, filed Nov. 30, 1972 and assigned to the assignee of the present invention.

This invention relates to the treatment of automotive exhaust gases from an internal combustion engine and, more particularly, to a low profile tow-bed catalytic converter with means for introducing air to the exhaust gas flowing through one of the beds of the converter for the conversion of undesirable constituents of exhaust gases of an internal combustion engine to an innocuous form.

The desirability of treating exhaust gases of an internal combustion engine to convert the undesirable constitutents thereof, particularly carbon monoxide, unburned hydrocarbons and oxides of nitrogen to an innocuous form is now well established. Of the various methods suggested for treating automotive exhaust gases, one of the more promising is the use of a catalytic converter. In automotive applications, a catalytic converter having a catalytic element, positioned therein is spaced in the engined exhaust system whereby exhaust gases from the engine pass into the converter and through the catalytic element which contains a catalytic material effective to oxidize CO and burn hydrocarbons to $CO_2$ and water and/or reduce the oxides of nitrogen before being released to the atmosphere.

Thus far to date, no catalyst has been found that works as effectively and to the same extent in both the reduction and oxidation conversion modes. Therefore, two-bed converter systems are used in the treatment of automotive exhaust gases. In one bed, the oxides of nitrogen are reduced effectively by catalytic action. In a second bed, air is injected for the purpose of effectively aiding oxidation of unburned hydrocarbons and converting carbon monoxide into carbon dioxide. Thus, reduction takes place in the first bed and oxidation takes place in the second bed due to the air-enriched atmosphere. Known two-bed converter systems have the disadvantage that the exhaust gases have a relatively long path to travel through the first and second beds, which are generally remote and separate from each other, resulting in loss of heat and therefore a lower efficiency of the second bed due to the temperature decrease and being characterized by a longer warm-up time for the converter.

The present low profile two-bed catalytic converter defines a catalyst-containing space formed by top and bottom catalyst-retaining plates which are mounted within a housing to define the exhaust flow through uniformly distributed openings in the top catalyst retaining plate to permit a uniform flow of exhaust gases through the catalyst containing space. A plurality of uniformly distributed openings in the bottom catalyst-retaining plate permit the exhaust to flow therefrom and hence through an outlet between the retaining plate and the housing for discharge from the converter. The catalyst containing space is divided into upper and lower catalyst beds by a partition member which includes a plurality of air channels and air nozzles therebetween. A plurality of openings in the partition member permit the uniform flow of exhaust gases therethrough and divide the flow of exhaust gases into a number of streams into which supplemental air is introduced from the air outlets of laterally directed nozzles.

Accordingly, it is an object of this invention to provide an improved low profile two-bed catalytic converter.

Another object is to provide a low profile two-bed catalytic converter of high structural integrity and efficiency which is simple in structure and construction and is therefore economical to manufacture.

A further object is to provide a low profile catalytic converter in which two catalyst beds are contained in a common hollow body, separated into upper and lower beds by a partition member which includes an air distribution means having a plurality of nozzles for introducing supplemental air to exhaust gases flowing through openings in the partition.

Another object of the invention is to provide a low profile catalytic converter having catalyst beds formed by upper and lower retaining members, each having a plurality of openings therein to provide uniform flow of exhaust gases through the catalyst space and with a partition member extending through the catalyst space to define upper and lower catalyst beds and thereby provide a compact design to avoid heat losses characterized by a short warm-up time for catalyst beds.

Another object is to provide a low profile catalytic converter with air distribution means formed in the catalyst bed which coact with an air inlet means which introduces secondary air to the lower catalyst bed, as well as acts as a fill hole plug to retain catalyst material within the catalyst-containing space.

Other objects and advantages of the invention will become apparent from the following detailed description, reference being had to the accompanying drawings of which:

FIG. 1 is a sectional view taken along section line 1—1 of FIG. 2 to show the interior of the converter and also reveal an interior portion cut away to show the placement of the partition means between the catalyst beds and the interior;

FIG. 2 is a top planar view of the converter with parts broken away to view the interior construction and arrangement of the air distribution partition member;

FIG. 3 is a fragmentary sectional view taken along section line 3—3 of FIG. 2 to show the fill plug adapter and air inlet in alignment with the air passage in the air distribution member;

FIG. 4 is a sectional view taken along section line 4—4 of FIG. 2 and showing the mounting of the air distribution and partition member on the stud means and the other portions of the converter in assembly.

Referring to the drawings, the catalytic converter comprises a housing 10 preferably made from high chromium stainless steel or coated or plated steel or any of the steels or metals that are effective in resisting the corrosive attack of high temperature, road salts and the like, and exhaust, as well as other gases. Housing 10 is comprised of a top housing plate or shell member 12 and a bottom housing plate or shell member 14 which include extensions 16, 18 generally located opposite each other to define an inlet and an outlet that are adapted for connection to the engine exhaust system. Peripheral flanges 20, 22 extend substantially around the entire periphery of the converter.

Mounted within the housing 10 is an inclined catalyst-retaining element 24 made up of top plate member 26 and a bottom plate member 28. The catalyst retaining element 24 is divided into two separate catalyst beds, the top or upper bed 30 and the bottom or lower bed 32. The upper and lower beds 30, 32 are separated from each other by a partition member 34 that is made up of an upper sheet metal plate 36 which has a plurality of uniformly distributed openings 37 therein and a similarly perforated lower sheet metal plate 38 with an air distributing or air carrying member 40 sandwiched between the plates 36, 38. Member 40 is likewise made up of two sheet metal plates 42, 44, each having a plurality of uniformly distributed openings 45 therein. The plates 42, 44 have a plurality of bulbous-shaped air nozzles 46 formed therein which are connected to continuous circular air passages 48. The passages 48 are connected to a radially extending common air inlet passage 50 that is directed substantially perpendicular to the continuous lateral oriented air passages 48. The nozzles 46 and passages 48, 50 feed air to mix with the exhaust gases flowing through the openings 45 in the air distribution means 40. In the illustrated embodiment, the nozzles 46 have openings 52 to direct supplemental air into the exhaust gas stream in a lateral direction. This promotes thorough mixing of exhaust gases and the supplemental air.

For ease of assembly, the partition member 34 is assembled as a unit with the respective members 36, 38 and 42, 44 welded together or held in an assembled relationship by any convenient manner and are likewise positioned in any convenient manner within the catalyst retaining element. A preferred manner of holding the partition 34 in the catalyst space is by welding the partition to the member 26 as at 54 in FIG. 1. The stud member 64 shown in FIG. 4 and to be hereinafter described also may be utilized to orient and support the partition member.

Reference is made to the catalyst retaining assembly 24 and specifically to the catalyst retaining plates 26, 28 which are best shown in FIGS. 3 and 4. The upper and lower retaining plates 26, 28 include gas impervious wall portions 56 and 58 which are spaced from housing 10 and generally encircle a gas pervious portion which is perforated by a plurality of uniformly distributed opening means 55. The openings 55 in the illustrated preferred embodiment are provided by striking out a portion of the plates 26, 28 to define a slit or aperture between the struckout portion and the remainder of the plate. The uniform placement of the openings 55 as shown in FIG. 2 permits an even distribution of exhaust gases through the catalyst beds 30, 32 which in cooperation with the uniformly spaced openings 45 in the partition member effectively provide an evenly distributed flow through the catalyst material 24.

The catalyst retaining member 24 is supported within the housing formed by members 12, 14 by peripheral flange portions 60, 62 which extend from the top and bottom plates, respectively. The flange 60 is welded or fastened by any convenient means on flange 62 which is extended outward to be located between the flanges 20, 22 of housing members 12 and 14 to support and orient the retaining member 24 in sloping relationship within housing 10. The members 20, 22 and 62 comprise a three-layer sandwich which is fastened along the peripheral edge by some convenient means, such as welding or the like, to form a leak-free catalytic converter having exhaust system connections at 16, 18. In addition, stud and washer means, respectively, are also used to hold the assembly together and to provide strength to the assembly. In this case only one stud and washer means are used but it is understood that a plurality of such studs and washers could be used if desired.

As shown more clearly in FIG. 4, stud 64 includes a radially extended portion which forms shoulders 68 thereon at both ends. The reduced diameter end portion of the stud 64 passes through the outer housing members 12, 14 and through the catalyst-retaining members 26 and 28. Washers 66 are welded or attached to the ends of the stud member 64 and to the top plate 12 and bottom plate 14 in any convenient manner to aid in holding the aforementioned parts in assembled fixed relationship. A second shoulder 70 formed by a radially extended mid-portion of stud 64 supports the air distribution and partition assembly 34 in the approximate center of the space defined by upper and lower retaining plates 26, 28.

Also formed in members 12, 14 of housing 10 are a plurality of ridges or indentations 72 that aid in strengthening the housing member, as well as aiding in locating the catalyst-retaining member 24 within the housing. As can be seen in FIG. 1, catalyst-retaining member 24 has a number of locating members 74 in the shape of protuberances that abut against the ridges 72.

Referring to FIG. 3, there is shown a closure means 76 that can be pressed or screwed into the housing 10 and which retains the air inlet nozzle 78 at the center. If it is ever necessary to refill the converter with new catalyst material, closure 76 is removed intact with the nozzle 78, the catalyst replaced by any convenient means, and the closure replaced. It should be noted that because member 76 retains the nozzle 78 at its center, the nozzle automatically lines up with the air passage 50 in member 40 so that supplemental air is directed into the passage 50 of the air distributor 40. The lateral wall of the air inlet nozzle 78 also retains the catalyst material 24 within beds 30, 32. An opening is also provided at 80 in the side of the housing 10 to permit the use of a sensing device, if necessary, for monitoring the operation of the converter.

In operation, exhaust gas passes from the engine through the inlet opening 16 to a space between the upper housing member 12 and the upper catalyst retaining member 26. This space has a decreasing depth with increasing distance from the inlet 16 to uniformly distribute exhaust gases across the upper surface of the member 26. The plurality of distributed opening means 55 in member 26 provides for a uniformly distributed flow of exhaust gases through the upper catalyst bed 30 where reduction of oxides of nitrogen takes place. The exhaust gases then pass through the plurality of openings 37 in the member 36 and subsequently through the openings 45 in the air distributor member 40. Simultaneously, supplemental air is introduced to the converter through the inlet 78, passages 48 and 50 and the nozzles 46. The supplemental air passes from nozzles 46 through the openings 52 in a lateral direction with respect to the flow of exhaust gases through openings 45 to provide a uniform mixing of supplemental air and exhaust gases. This provides an even distribution of supplemental air to the exhaust gases across the entire catalyst surface area. The mixture of exhaust gas and air then flows through openings 37 in lower member 38 and through the lower catalyst bed where oxidation of unburned hydrocarbons and carbon monoxide takes place in an enriched atmosphere. The treated exhaust gases then flow through opening 55 in member 28 and into the exhaust space formed between the lower retaining member 28 and the bottom housing member 14 before being discharged from the converter through the outlet opening 18.

The supplemental air is introduced to the lower catalyst bed 32 when the light-off temperature of the catalyst is reached, which is generally between 90 and 125 seconds after engine startup. The rate of supplemental air introduced to exhaust gases before the lower catalyst bed is preferably within the range of 5 to 15 cubic feed per minute. It is understood that with modifications in the converter design within the scope of the present invention and with converters of increased or decreased capacity, other rates of air introduction may be desirable.

Although the invention has been described in terms of certain specific embodiments, it is understood that other forms may be adapted within the scope of the invention.

What is claimed is as follows:

1. A two-bed catalytic converter for automobile use comprising in combination: a top housing plate, a bottom housing plate, and a catalyst retaining means also having top and bottom plates therebetween, said top and bottom housing plates and at least one of said catalyst retaining plates having mating peripheral faces over substantially their entire peripheries to form a layered assembly suitable for sealing substantially along the entire length of the mating peripheries, a partition member within said catalyst retaining means that divides the catalyst retaining means into an upper and lower catalyst bed, said partition comprising upper and lower plates having an air distribution member therebetween, said upper and lower plates and air distribution member each having a plurality of evenly distributed openings through which exhaust gases flow from the upper to the lower catalyst bed, said air distribution member being formed by two overlying plate members with outwardly drawn portions defining a plurality of air nozzle means each having an air outlet adjacent the openings through said air distribution member and with the said nozzle means being connected to similarly formed continuous air passage means between said overlying plates, inlet air passage means including an inlet air nozzle interconnected with said continuous air passage means formed between said overlying plates to supply air from an outside source through said air passage means to said nozzle means, said air outlets of said nozzle means being adjacent each of said openings through said overlying plates of the air distribution member to discharge the air directly into the flow of exhaust gases through the openings in the overlying plates.

2. A converter as set forth in claim 1, having at least one support stud extending between said housing plates and through the catalyst retaining plates and partition member with said support stud having shoulders at either end thereon cooperatively associated with openings in said housing plates, and another shoulder near its mid-portion adapted to engage said member, to maintain a predetermined spacing therebetween as well as add integral strength to said converter, said support stud being anchored to said housing plates by reinforcing washers disposed about said support stud at said housing plates, by continuous annular welds.

3. A two-bed catalytic converter for automobile use comprising in combination: a top housing plate, a bottom housing plate, and a catalyst retaining means also having top and bottom plates therebetween, said top and bottom housing plates and at least one of said catalyst retaining plates having mating peripheral faces over substantially their entire peripheries to form a layered assembly suitable for sealing substantially along the entire length of the mating peripheries, a partition member within said catalyst retaining means that divides the catalyst retaining means into an upper and lower catalyst bed, said partition comprising upper and lower plates having an air distribution member therebetween, said upper and lower plates and air distribution member each having a plurality of evenly distributed openings through which exhaust gases flow from the upper to the lower catalyst bed, said air distribution member formed by two overlying plates with outwardly drawn portions defining a plurality of air nozzle means each having an air outlet and being connected to a plurality of continuous concentric air passages formed between said overlying plates by outwardly drawn portions, an inlet air nozzle leading into the interior of said converter through the housing plates, an inlet passage extending substantially perpendicular to the continuous concentric air passages between said overlying plate members engaging said inlet nozzle to supply air from an outside air source through said air passages to the nozzle means, said air outlet of each of said nozzle means being located adjacent said openings in said overlying plates in the air distribution member and extending in a direction substantially normal to the flow of exhaust gases through said openings to discharge the air directly into the flow of exhaust gases therethrough.

4. A two-bed catalytic converter for automobile use comprising in combination: a top housing plate, a bottom housing plate, and a catalyst retaining means also having top and bottom plates therebetween, said top and bottom housing plates and at least one of said catalyst retaining plates having mating peripheral faces over substantially their entire peripheries to form a layered assembly suitable for sealing substantially along the entire length of the mating peripheries, a partition member within said catalyst retaining means that divides the catalyst retaining means into an upper and lower catalyst bed, said partition comprising upper and lower plates having an air distribution member therebetween, said upper and lower plates and air distribution member each having openings through which exhaust gases flow from the upper to the lower catalyst bed, said air distribution member also having air nozzle means forming an air outlet opening and being connected to a continuous air passage within said air distribution member, inlet air nozzle and inlet passage means interconnected with said continuous air passage in said air distribution member to supply air from an outside source through said air passage to said nozzle means, said air outlet openings of said nozzle means being adjacent said openings in the air distribution member to discharge the air directly into the flow of exhaust gases therethrough, closure means that closes a catalyst fill hole in said converter and further integrally retains said inlet air nozzle in a position to assure that said inlet air nozzle aligns itself with the inlet air passage when said closure means is placed in the fill hole in said converter.

* * * * *